United States Patent
Yu et al.

(10) Patent No.: US 11,508,172 B2
(45) Date of Patent: Nov. 22, 2022

(54) IDENTIFYING LOCATION OF SHREDS ON AN IMAGED FORM

(71) Applicant: DST Technologies, Inc., Kansas City, MO (US)

(72) Inventors: Zangnan Yu, Oakland, CA (US); Jacob Abernethy, Oakland, CA (US); Ramesh Sridharan, Oakland, CA (US)

(73) Assignee: DST Technologies, Inc., Kansas City, MO (US)

(*) Notice: Subject to any disclaimer, the term of this patent is extended or adjusted under 35 U.S.C. 154(b) by 78 days.

(21) Appl. No.: 16/230,578

(22) Filed: Dec. 21, 2018

(65) Prior Publication Data

US 2019/0205632 A1 Jul. 4, 2019

Related U.S. Application Data

(60) Provisional application No. 62/611,419, filed on Dec. 28, 2017.

(51) Int. Cl.
*G06V 30/412* (2022.01)
*G06T 5/00* (2006.01)
(Continued)

(52) U.S. Cl.
CPC .......... *G06V 30/412* (2022.01); *G06T 3/0012* (2013.01); *G06T 3/40* (2013.01); *G06T 5/002* (2013.01); *G06T 5/50* (2013.01); *G06T 7/70* (2017.01); *G06V 10/28* (2022.01); *G06V 10/457* (2022.01); *G06K 9/6256* (2013.01); *G06T 2207/20024* (2013.01);
(Continued)

(58) Field of Classification Search
CPC .... G06K 9/00449; G06K 9/38; G06K 9/4638; G06K 9/6256; G06T 7/70; G06T 3/0012; G06T 3/40; G06T 5/002; G06T 5/50; G06T 2207/20024; G06T 2207/20081; G06T 2207/20216; G06T 2207/20224; G06T 2207/30176
USPC .......................................................... 382/195
See application file for complete search history.

(56) References Cited

U.S. PATENT DOCUMENTS

| 6,987,886 | B1* | 1/2006 | Okubo | G06T 5/007 |
| | | | | 382/194 |
| 2003/0095270 | A1* | 5/2003 | Guo | G06K 9/38 |
| | | | | 358/1.9 |

(Continued)

OTHER PUBLICATIONS

Otsu's Method, Wikipedia article (Year: 2015).*

*Primary Examiner* — Mark Roz
(74) *Attorney, Agent, or Firm* — Perkins Coie LLP; Colin Fowler; Brian Coleman

(57) ABSTRACT

Disclosed herein is a machine learning application for automatically reading filled-in forms. There are multiple steps involved in using a computer to accurately read a handwritten form. First, the system identifies the form. Second, the system identifies what parts of the form are important. Third, the important parts are extracted as image data (known as shreds). Finally, fourth, the system interprets the shreds. This application is focused on steps two and three of that overall process. The disclosed techniques relate to training a machine learning system on a given series of forms such that when provided future filled-in forms within that series, the system is able to extract the portions of the filled-in form that are important/relevant.

18 Claims, 11 Drawing Sheets

(51) Int. Cl.
*G06T 3/40* (2006.01)
*G06T 7/70* (2017.01)
*G06T 5/50* (2006.01)
*G06T 3/00* (2006.01)
*G06V 10/28* (2022.01)
*G06V 10/44* (2022.01)
*G06K 9/62* (2022.01)

(52) U.S. Cl.
CPC ............ *G06T 2207/20081* (2013.01); *G06T 2207/20216* (2013.01); *G06T 2207/20224* (2013.01); *G06T 2207/30176* (2013.01)

(56) References Cited

U.S. PATENT DOCUMENTS

| | | | | |
|---|---|---|---|---|
| 2006/0007189 | A1* | 1/2006 | Gaines, III | G06K 9/222 345/179 |
| 2006/0066722 | A1* | 3/2006 | Yin | G06T 7/254 348/143 |
| 2010/0290710 | A1* | 11/2010 | Gagvani | H04N 5/91 382/224 |
| 2013/0004098 | A1* | 1/2013 | Washio | G06T 5/002 382/264 |
| 2017/0004359 | A1* | 1/2017 | Venkatachalam | G06T 7/11 |
| 2017/0148172 | A1* | 5/2017 | Segawa | G06T 7/11 |

* cited by examiner

IDENTIFYING LOCATION OF SHREDS ON AN IMAGED FORM

CROSS-REFERENCE TO RELATED APPLICATIONS

This application claims the benefit of U.S. Provisional Patent Application No. 62/611,419, filed Dec. 28, 2017, which is incorporated by reference herein in its entirety.

BACKGROUND

Filling out paper forms is a part of life. A trip to a doctor's office, to the department of motor vehicles (DMV), to an office of a potential new employer, etc., often involves filling out a paper form. Such forms have fields for people to provide information, such as a field for a person's name, another for his address, yet another for his phone number, etc. An employee of the doctor, the DMV, etc. often electronically captures the information entered on the form by manually entering the information into a computer. Once electronically captured, the information can be added to a database, a spreadsheet, an electronic document, etc., where the information can be stored for future reference.

BRIEF DESCRIPTION OF THE DRAWINGS

One or more embodiments are illustrated by way of example in the figures of the accompanying drawings, in which like references indicate similar elements.

FIG. 2 is a sample scanned form registered in a particular configuration.

FIG. 3 is a first partial product of the sample form of FIG. 2 pre-processed and using inverted coloring in greyscale.

FIG. 4A is a second partial product including a reconstruction of the image of FIG. 3 using an average of all training data forms.

FIG. 9 is the detected field locations applied to the form of FIG. 2.

DETAILED DESCRIPTION

Figure 1:
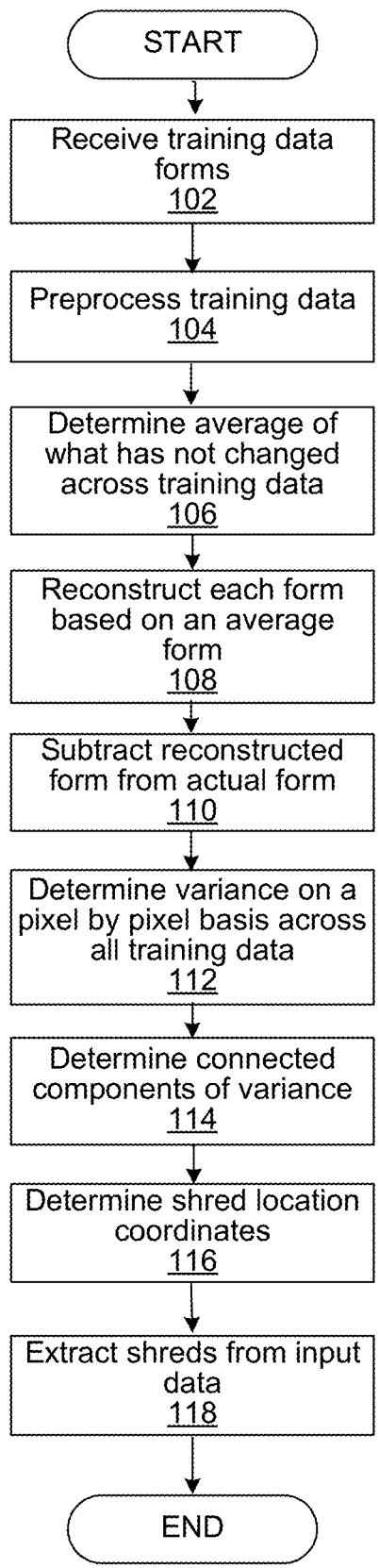
FIG. 1 is a flowchart of a method to identify a set of form locations for form fields.

Optical Character Recognition (OCR) is traditionally used to convert images of machine printed text into textual content. Intelligent Character Recognition (ICR) is used to do the same for images of handwritten text. State-of-the-art OCR engines can work well, for example, when the data is clean and where the OCR engine can be adjusted to deal with a single font or a small set of fonts. State-of-the-art ICR engines are not as capable as state-of-the-art OCR engines. Resultantly, today's ICR engines may not be sufficiently capable for many real-life applications. It is desirable to have a system that can covert images of handwritten character strings into textual content with very low error rates, e.g., <0.5%, while minimizing the amount of necessary human labeling.

Introduced here is technology related to automatically identifying and extracting handwritten portions of any series of forms. There are multiple steps involved in using a computer to accurately read a handwritten form. First, the system identifies the form. Second, the system identifies what parts of the form are important. Third, the important parts are extracted as image data (known as shreds). Finally, fourth, the system interprets the shreds. This application is focused on steps two and three of that overall process.

When processing a large number of forms, it is most efficient computationally to identify important portions of a given type of form to extract (via coordinates), and the subsequently extract those coordinates from each form. In contrast, individually identifying the location of handwriting on each form is inefficient. Further, identifying portions of the form (shreds) to extract reduces the computational workload as comparisons between unknown shreds and known shreds can focus on specific answers as opposed to the whole form at once. Extracting shreds reduces the size of any given task and increases parallelism in processing.

A form is a piece of material, such as a piece of paper, plastic, fabric, cardboard, etc., on which data/information/graphics/etc. that define the form is printed, written, etc. For example, a form can be a piece of paper which election commission records are recorded, a client intake questionnaire for a doctor's office is printed, a piece of paper on which an information data sheet for the Department of Motor Vehicles (DMV) is printed, a piece of plastic for an overhead projector on which a teacher draws a table for gathering student preferences for a field trip, a cardboard box for a cereal on which a contest entry sheet is printed, or other suitable written documentation known in the art.

A shred is digital data, such as a digital file, that includes an image of a portion of a document, such as an image of a filled out field of a form, an image of a portion of a filled in field of a form, an image of the entire form, etc. For example, a shred can include an image of a filled out "State" field of a form, an image of a filled out "Date" field of a form, an image of a single character of the field, such as a letter, number, punctuation mark, etc. The portion can include a symbol, such as an "=", an "$", an "%", etc. A shred can include any or all of the characters/symbols/etc. that are written or otherwise entered into a field of a form.

Training Phase

FIG. 1 is a flowchart of a method to identify a set of form locations for form fields. In step 102, a machine learning system receives a set of training data forms into a database. The training data forms are filled-in (uniquely) each containing different data, often in varied handwriting. In performing a single cycle of the method, the training data forms all adhere to a single style or series of forms. The forms have the same structure and fields. This method may be operated separately for different series of forms and the results are stored separately. After training, once a form type is determined, the machine learning system determines the proper set of coordinates to extract and extracts based on that form type.

In step 104, the training data is preprocessed. The purpose of the pre-processing is to make the problem easier to solve. First each of the training data forms are registered to the same position. The registration is performed in order to line up the locations of the form structure. Second, the forms are read into the system in greyscale to reduce variance and image size. Third, the image size is reduced in order to blend pixels and reduce image noise (smudges, scanning errors, additional particles on the physical document, etc.). Finally, the image coloring is inverted in order to prepare for step 110. Each of the accuracy improving steps is non-essential but ultimately improves the result.

In step 106, the machine learning system determines the average of what has not changed across the training data. This step is focused on discovering which portions of the form are the form structure. The form structure is not the important part of a given instance of a filled out form, rather the filled in portions are important. The filled in portions are the varied parts of the form. In determining which portions of the form do not change, the system determines what to remove.

In order to determine the average of what hasn't changed the machine learning system employs a statistical analysis. Incremental principal component analysis (IPCA) is an effective statistical analysis for determining how a given data set varies. IPCA is a public library available through SKlearn. A capture on Jun. 26, 2017 of IPCA is available through the Internet Archive at https://web.archive.org/web/20170626004937/http://scikit-learn.org/stable/modules/generated/sklearn.decomposition.IncrementalPCA.html.

To perform the analysis here, the pixel values of all of the training data are placed into a 3-dimensional matrix (vertical pixels, horizontal pixels, # of forms of training data). Then, the 3-dimensional matrix is flattened into a 2-dimentional matrix by combining the vertical and horizontal pixel values across a single axis (if a given form is 850×1100 pixels, the combined axis has 935,000 pixels).

The IPCA step is performed across the resulting 2-dimentional matrix. The IPCA step extracts scheme of variance across the set of forms. The scheme has less information than the total training data.

In step 108, the extracted scheme of variance is used to approximate each of the forms within the training data based on the degree of variance that individual form exhibits. Each form is in turn linearly reconstructed from the extracted scheme. At this stage, there are now reconstructed images for each of the training data forms.

In step 110, the reconstructed images are subtracted from the inverted, pre-processed, scanned images. The result, or reduced training data, is a set of pixels that reduces the presence/impact of the form structure. In some embodiments the result is further blurred to reduce noise and improve overall accuracy of the learning phase of the machine learning system. In step 112, the machine learning system determines the variance across the subtracted/reduced training data forms. The determined variance, or variance graph, is a single set of pixels based on the collection of training data. The single set of pixels is generated based upon an examination of variance in pixels across each of the reduced training data of step 110.

Each pixel in the variance graph no longer directly represents image data, but a magnitude value for variance. For example, a single, specific pixel value (0-255) is compared across all of the reduced training data. Based on the range that the specific pixel varies, the corresponding pixel in the variance graph is assigned a new value based on the magnitude of the variance range. For example, where a byte is used for each pixel, high variance is 255, whereas no variance is 0.

In step 114, the machine learning system generates a connected components of the variance graph. Specifically, the components connected are the pixels having high variance in the variance graph, and those pixels that are nearby. The connected components are then organized into blocks. Nearby pixels are determined based on a connected components algorithm, and those that complete a block. For example, a block may be shaped like a rectangle; therefore, the nearby pixels for a connected component are all those that form a complete rectangle around associated high variance pixels within the variance map.

In step 116, the blocks are pruned into shred locations/coordinates. In some embodiments, some blocks are filtered out based on size thresholds. Size may be based on number of included pixels or percentages of pixels included as compared to pixels associated with a given parameter of the variance map (e.g., total number, number of pixels included on a given axis, or number of pixels included in a given region).

In step 118, the system has completed the learning phase and begins extracting shreds from input data. The system shreds future input data of filled-in forms according to the coordinates of the blocks that were not filtered out.

Visual Representations of Partial Products

FIGS. 2 through 9 are rendered images of partial products associated with the disclosure herein. Each serves to provide a visual representation or "proof of work" of steps involved. These images need not actually be rendered in order arrive at a desired result. Each image is a sum of data points visually represented. The techniques taught herein can be performed merely on the data points. In performing the disclosed methods on disclosed systems one may render all, none, or some of the associated images. Each partial product displayed is not necessarily part of required steps. In some embodiments, partial products may be combined and/or eliminated to improve computational efficiency.

Figure 2:
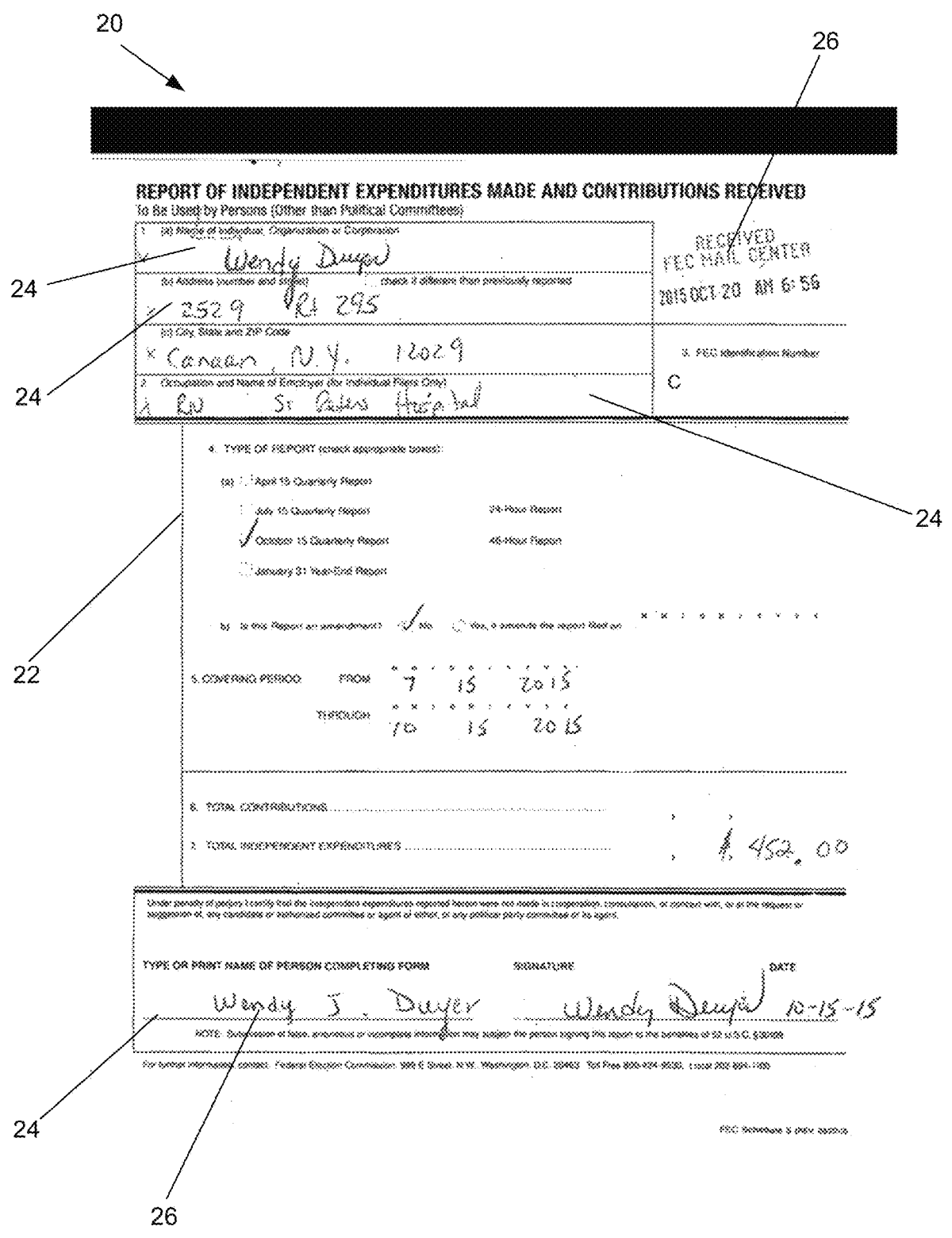

FIG. 2 is a sample scanned form 20 registered in a particular configuration. The particular form 20 included in the figure is a report of a political contribution to a campaign. This form was chosen merely for the public nature of the data thereon, and techniques described herein are effective on any form document. Each form has form structure 22 including a number of form fields 24, and form responses 26. The form responses 26 may be typed, stamped, handwritten, or provided with another suitable marking technique known in the art. The scanned form 20 makes up a single entry in a large body of training data. Each item of the training data has matching form structure 22 and fields 24, but varied responses 26 (based on the particular person who filled out the form).

To perform the taught technique the training data is sorted into groups of matching forms. The manner to determine what form a given imaged form 20 is, is the subject of another application. Disclosure concerning that technique may be found in U.S. Pat. No. 9,652,688, issued on May 16, 2017, entitled "ANALYZING CONTENT OF DIGITAL IMAGES"; and U.S. application Ser. No. 15/838,905, filed on Dec. 12, 2017, entitled "IDENTIFYING VERSIONS OF A FORM". The technique discussed herein is performed for each different form within a database of filled in forms.

The scanned forms 20 are registered similarly such that the form structure 22 matches across the set of training data. This decreases the error rate of the overall technique.

Figure 3:
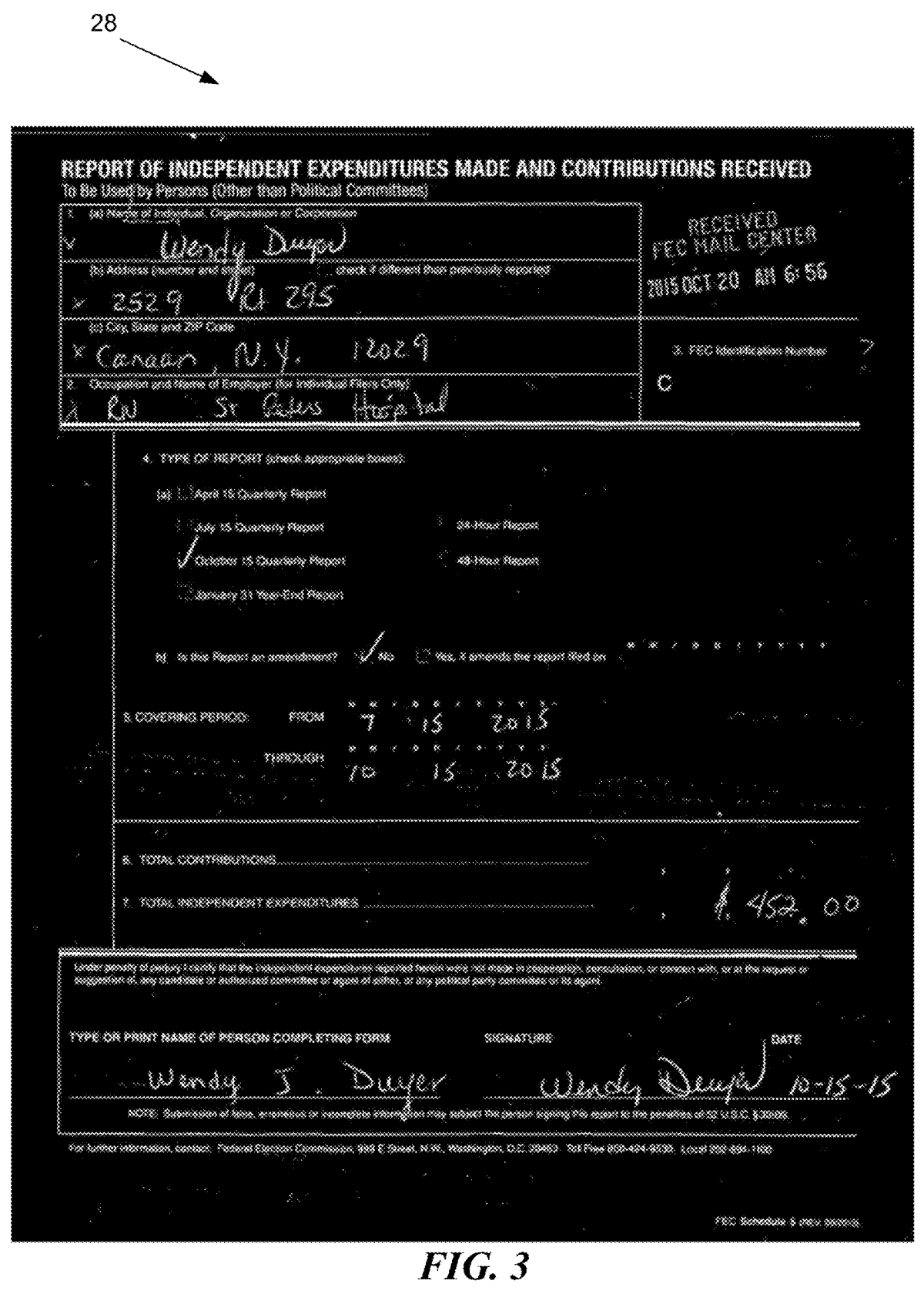

FIG. 3 is the sample form of FIG. 2 pre-processed and using inverted coloring in greyscale. This is a first partial product 28 of the taught technique. In order to get from FIG. 2 to FIG. 3, there are a number of steps. The first is to read in the scanned forms 20 with a computer vision module (e.g., OpenCV). OpenCV is a public library available through Opencv.org. A capture on Dec. 2, 2017 of OpenCV is available through the Internet Archive at https://web.archive.org/web/20171202 174943/https://opencv.org/.

In order to reduce the size of the imaged forms 20, only one color channel is used (e.g., greyscale). In some embodiments, the color channel is inverted to prepare for future processing and to aid in identifying noise. To further reduce the noise, the image is downsized (e.g., by a factor of 2). The downsize will average neighboring pixels and reduce the existence of single, or few pixel errors. Each item of training data is processed into the partial product of FIG. 3.

Figure 4A:
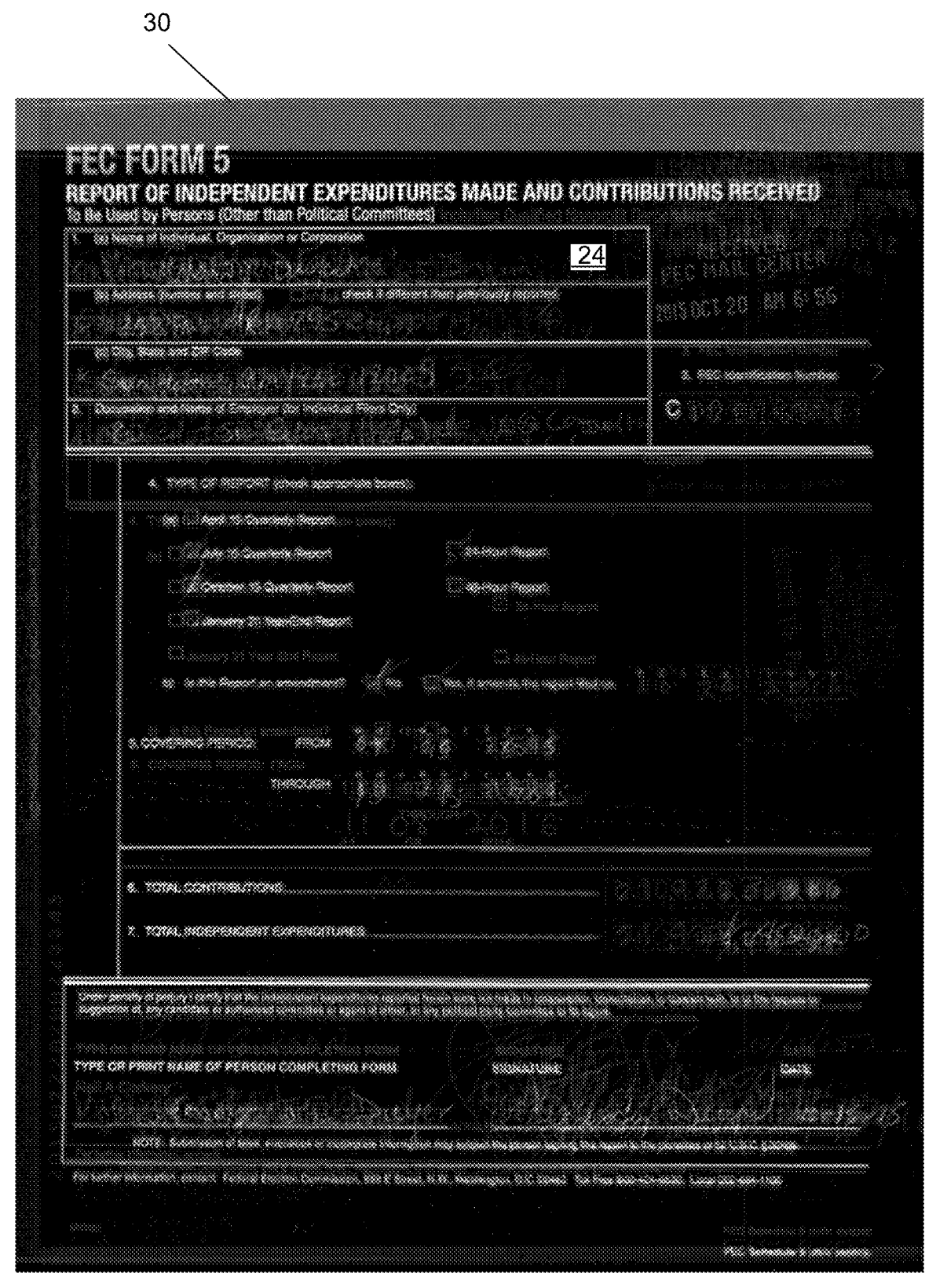
Figure 4B:
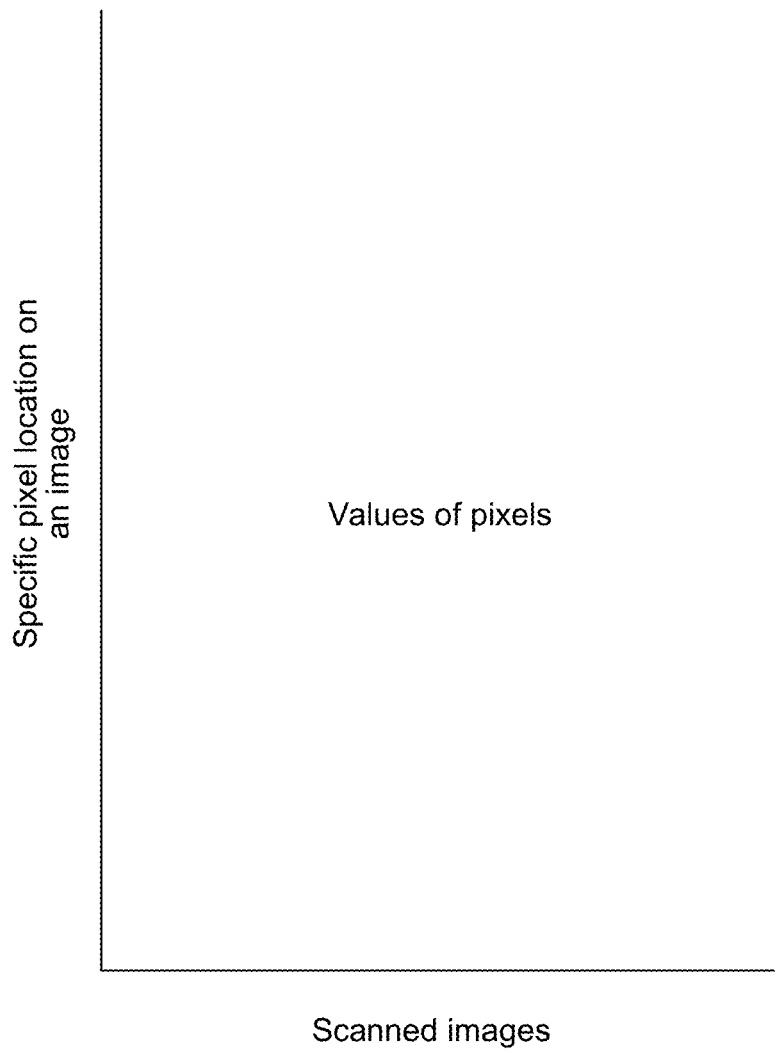
FIG. 4B is a matrix used for linear reconstruction of the average of training data forms.

FIG. 4A is a reconstruction of the image of FIG. 3 using an average of all training data forms. FIG. 4B is a matrix used for linear reconstruction of the average of training data forms. FIG. 4A displays a second partial product 30 of the taught technique. The second partial product 30 is a reconstruction of the first partial product 28 using a statistical model to find patterns throughout all of the training data. The goal of the second partial product 30 is ultimately to identify and remove the forms structure 24 based on a determination of what has not changed between the training data.

The second partial product 30 is an average of what has not changed across the training data and is generated with a statistical model. There is a second partial product 30 generated for each of the scanned images 20 within the training data. An example of a statistical model that effectively produces the second partial product 30 is Incremental principal component analysis (IPCA). While the IPCA library is used to provide an example here, other statistical models are also suitable provided that they respectively can create a second partial product 30 that is an average of the overall training data for each item of the training data.

To perform the analysis here, the pixel values of all of the training data are placed into a 3-dimensional matrix (vertical pixels, horizontal pixels, # of forms of training data). Then, the 3-dimensional matrix is flattened into a 2-dimentional matrix by combining the vertical and horizontal pixel values across a single axis (if a given form is 850×1100 pixels, the combined axis has 935,000 pixels).

As a result of the imperfection of registration of the scanned images 20, the registration of the original printed form, and imperfections in the digitizing of a filled out physical form, there is some noise in the matrix. Portions of the form structure 22 will not always line up into the same row or column of the matrix (depending on how the matrix is coordinated).

The IPCA step is performed across the resulting 2-dimentional matrix. For purposes of explanation, training data from a given scanned image 20 is represented in a single column and matching pixels of different training data is represented across a row (See FIG. 4B). In various embodiments, the configuration of the matrix may vary. The IPCA step extracts a scheme of variance from the training data. The scheme has less data than the total amount of training data.

The extracted scheme is used to approximate each of the columns (forms) in the training data. Each column is in turn linearly reconstructed from the extracted scheme based on the degree of variance that individual form exhibits. The resulting output is the second partial product 30 for each of the items of training data.

Figure 5:
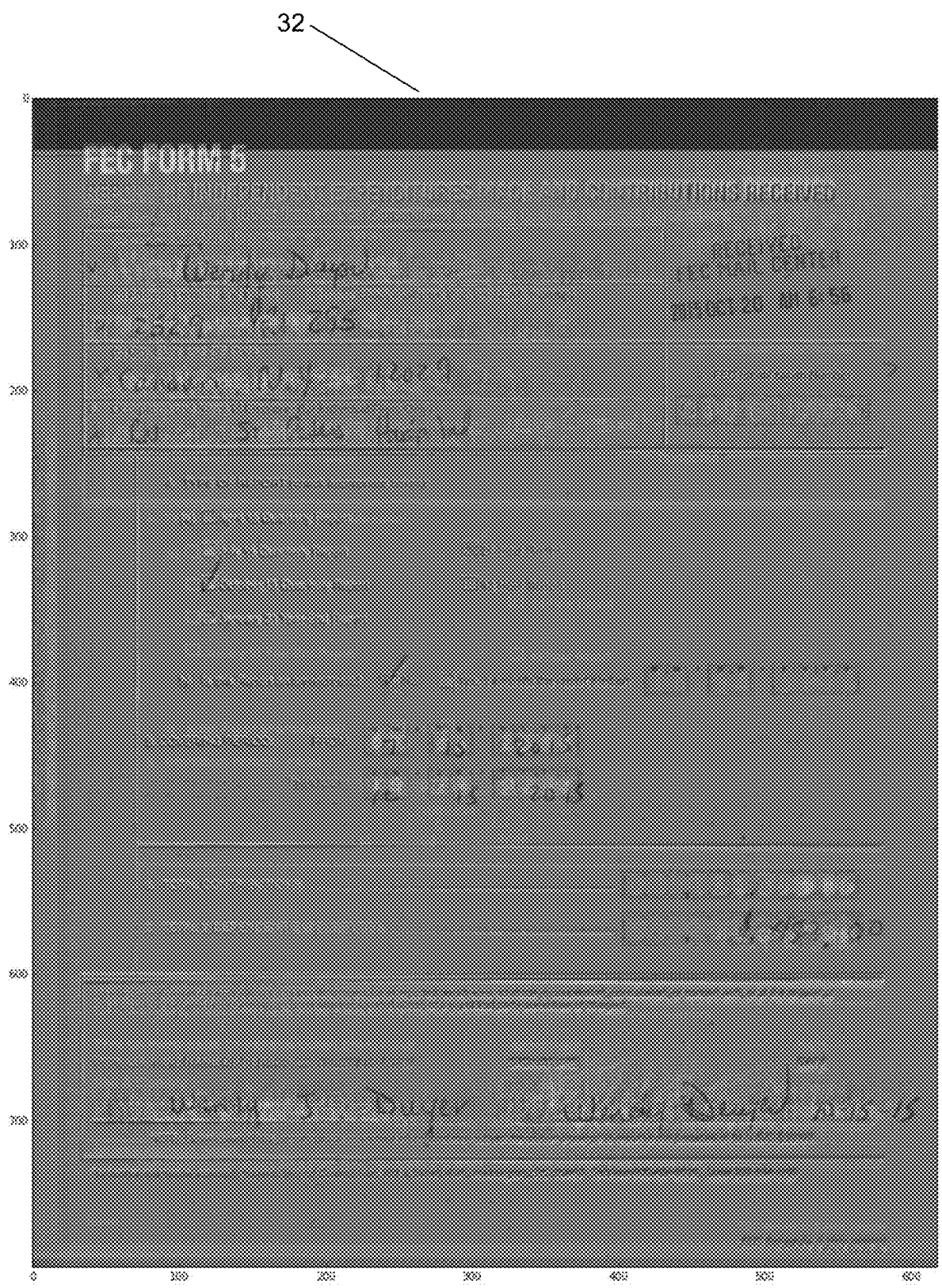
FIG. 5 is a resulting third partial product of a subtraction of an average form from an individual form of FIG. 2.

FIG. 5 is a third partial product 32 of a subtraction of an average form from an individual form. To generate the third partial product 32, the corresponding reconstructed image (the second partial product 30 shown in FIG. 4) is subtracted from the inverted, pre-processed, scanned image 20 (the image of FIG. 3). The subtraction is performed using the corresponding images. That is to say, that the minuend is a particular pre-processed form and the subtrahend is the second partial product 30 that corresponds to that particular pre-processed form.

Figure 6:
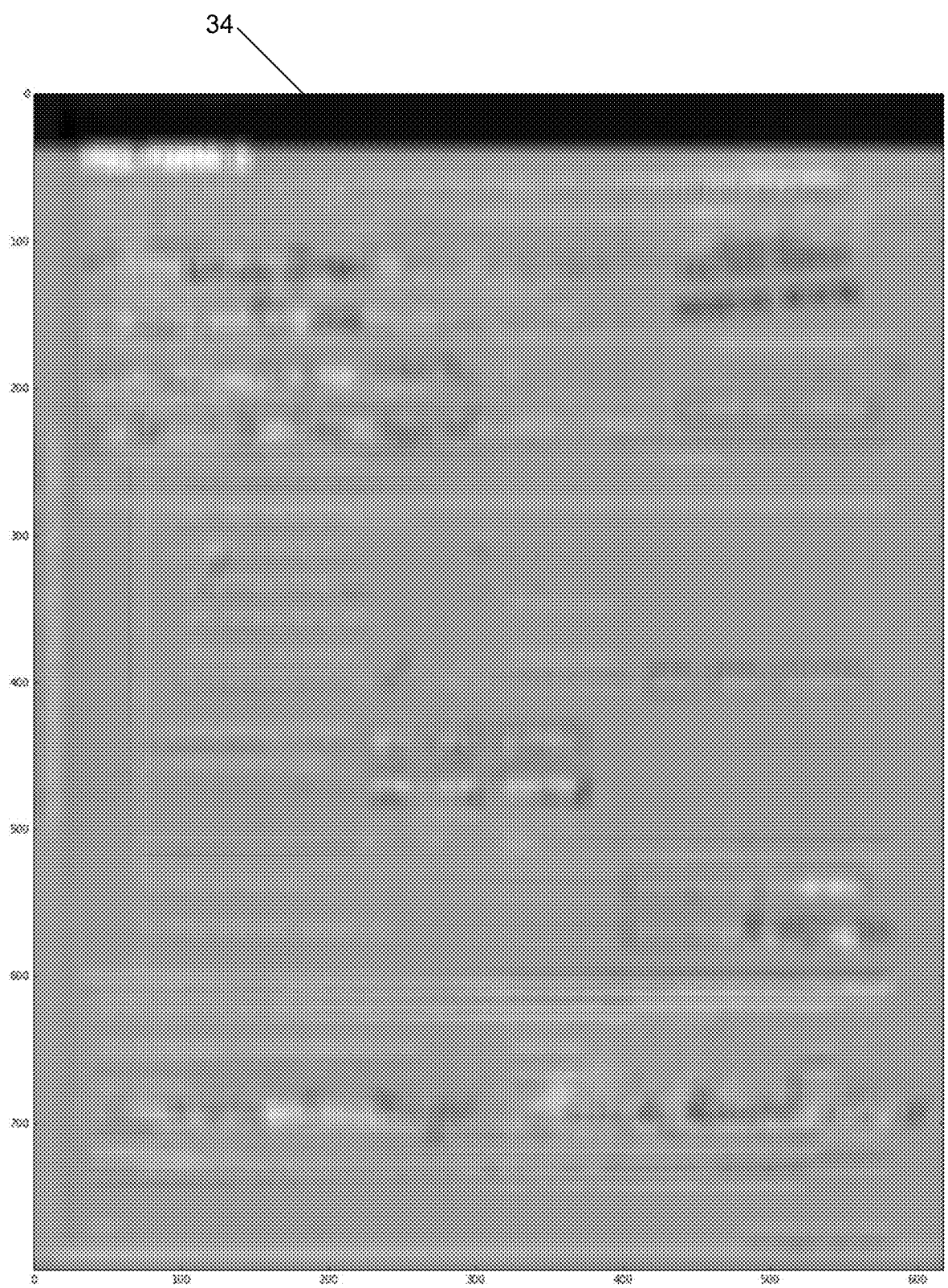
FIG. 6 is a fourth partial product and blurred version of the partial product of FIG. 5

FIG. 6 is a blurred version of the partial product of FIG. 5. FIG. 6 displays a fourth partial product 34. The fourth partial product 34 is a blurred version of the third partial product 32. The purpose of the blurring step is to further reduce noise. Noise reduction techniques will have a varied need based on the quality and variety of the original scanned images 20. The blurring also helps to spread a high value pixel to respective surrounding pixels (e.g., if a pixel has high value, then after blurring, the pixels around it will likely to increase value), which helps identify variance in a slightly broader range of pixels and give better results. The blurring can be performed by a computer vision module such as OpenCV.

Figure 7:
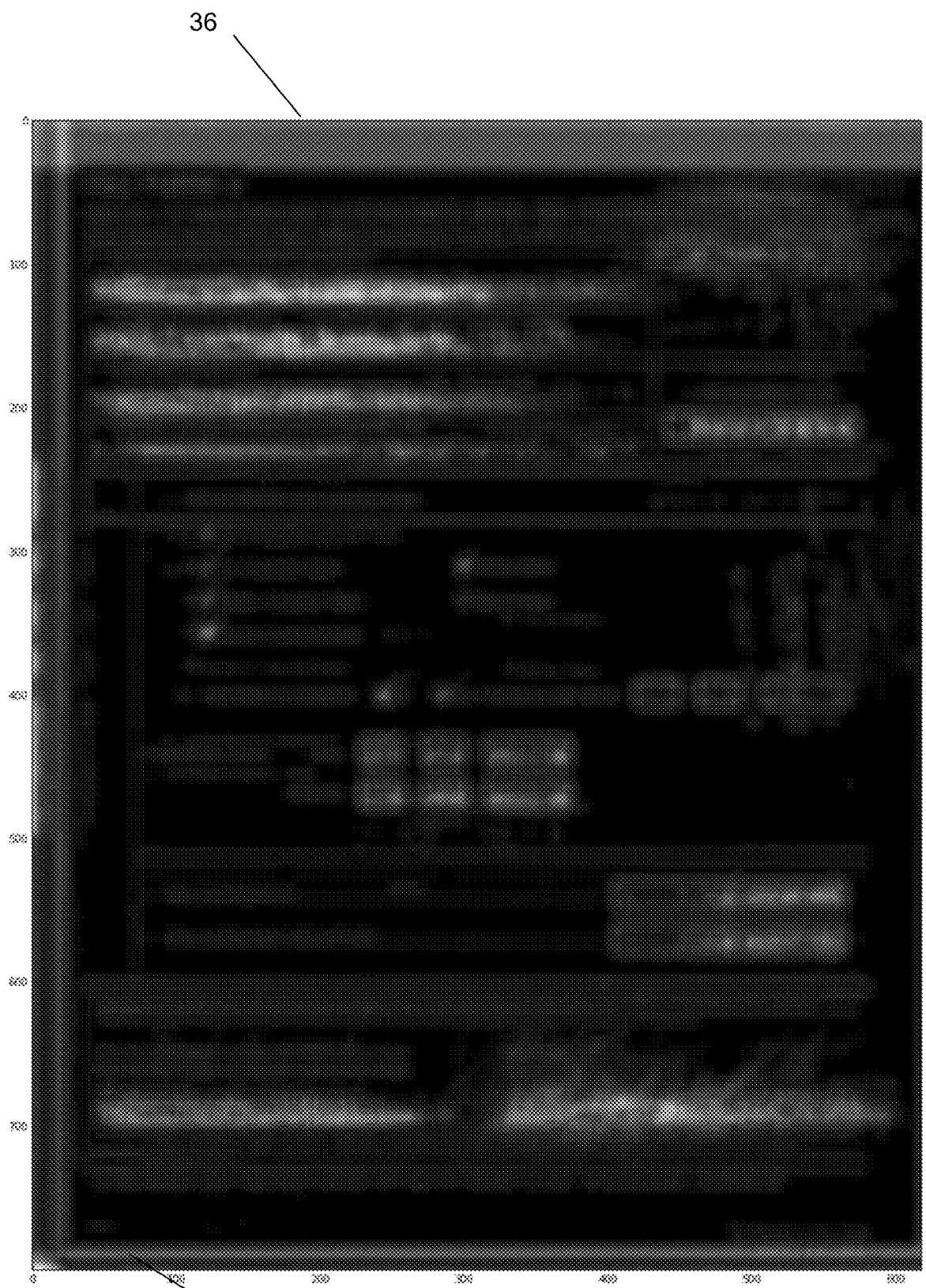
FIG. 7 is a fifth partial product displaying greatest variance across training data forms.

FIG. 7 is a fifth partial product 36 displaying greatest variance across training data forms. The fifth partial product 36 is a single image based on the collection of fourth partial product 34 images. The fifth partial product 36 is generated based upon an examination of variance in pixels across all of the fourth partial products 34. Each pixel in the fifth partial product 36 no longer directly represents image data, but a magnitude value for variance. For example, a single, specific pixel value (0-255) is compared across all of the fourth partial products 34. Based on the range that the specific pixel varies, the corresponding pixel in the fifth partial product 36 is assigned a new value (0-255) based on the magnitude of the variance range. For example, high variance is 255, whereas no variance is 0.

The actual assignment of new pixel values may follow any consistent scheme to accurately represent the magnitude of variance across the fourth partial products 34. The new pixel values do not necessarily have to be 0-255. For example, a single bit using a threshold evaluation may represent magnitude of variance. If the range of variance for a pixel is on over a certain threshold the bit is set to 1, otherwise the bit is set to 0.

Figure 8:
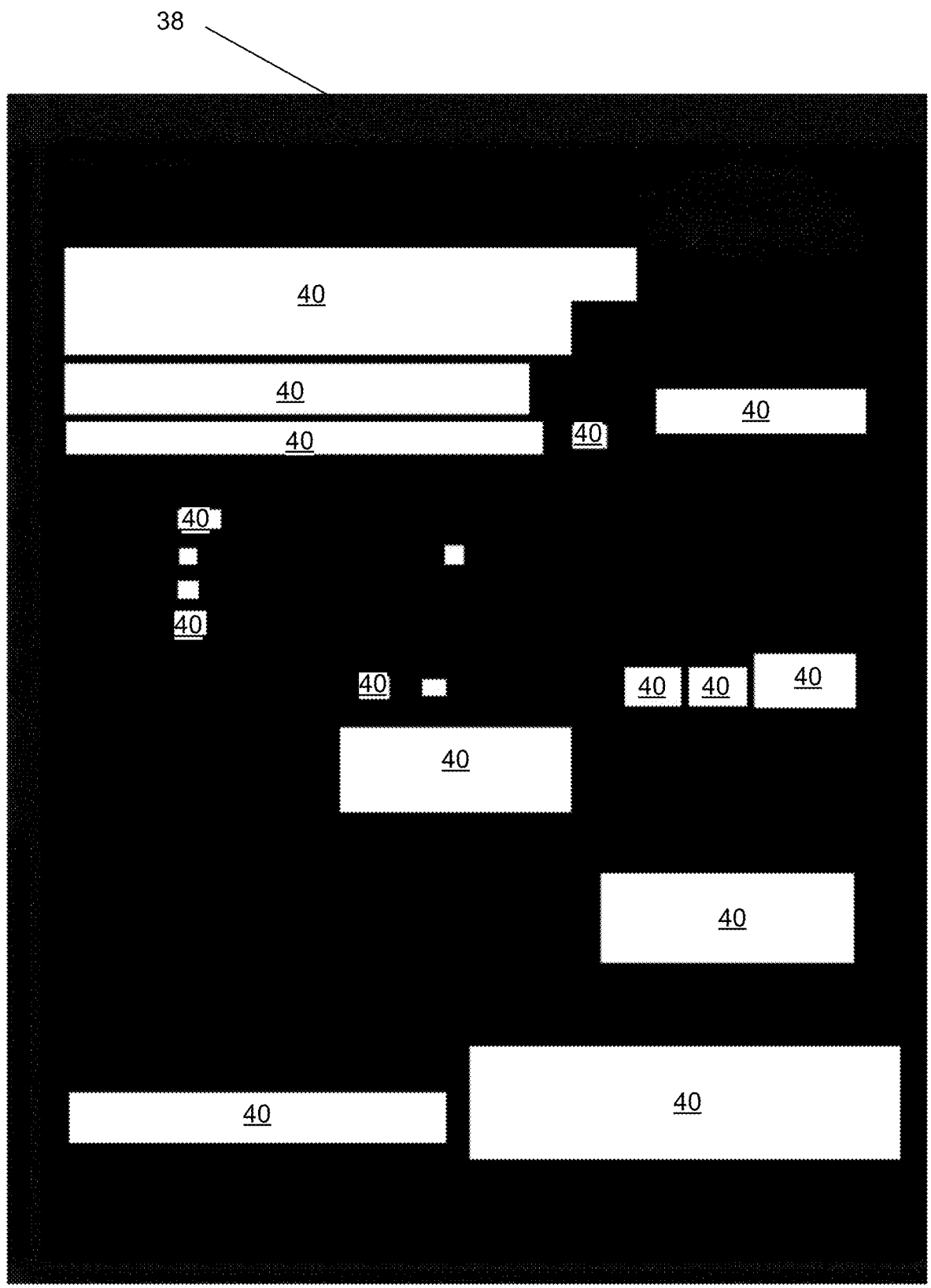
FIG. 8 is the detected location of fields in a given form.

FIG. 8 is the detected location of fields in a given form. FIG. 8 displays a final product 38. To get from the fifth partial product 36 to the final product, a groupings statistical analysis based on graph theory is performed. For example, a connected components analysis. The output of the connected components analysis are a number of blocks 40. The blocks 40 indicate a grouping together of pixels with high enough variance. Note that there are some notable portions of FIG. 7, such as bar at the bottom 42, with high variance in the fifth partial product 36 that do not have representative blocks 40 in the final product 38. Portions such as the bar on the bottom 42 are unwanted. This particular portion 42 is likely registration errors though other errors may also be present.

Some blocks 40 are filtered out of the final product 38. These blocks, such as that which would be corresponding to the bar at the bottom 42, are filtered using thresholds. In some embodiments, the thresholds regard coverage on a total percentage of the page, or percentage coverage of a particular axis on the page (e.g., a block that would otherwise run the full length of the page). Thresholds are used to filter out blocks that are both preconfigured as "too large" and those preconfigured as "too small". For example, a block may be too large if it covers 70% of a given page axis. Conversely, a block may be too small if it covers less than a percent of a given page axis.

The blocks 40 are ultimately a set of coordinates. These coordinates are used as locations to extract shreds. Each block 40 corresponds to a shred that is extracted from scanned images 20. The set of coordinates that the blocks 40 represent are the result of the training of the machine learning system. For a different form, the blocks 40 or coordinates are in different locations. This method is performed on each new form structure 22 that is input into the machine learning system. The machine learning system learns corresponding block coordinates in this manner for each form.

Figure 9:
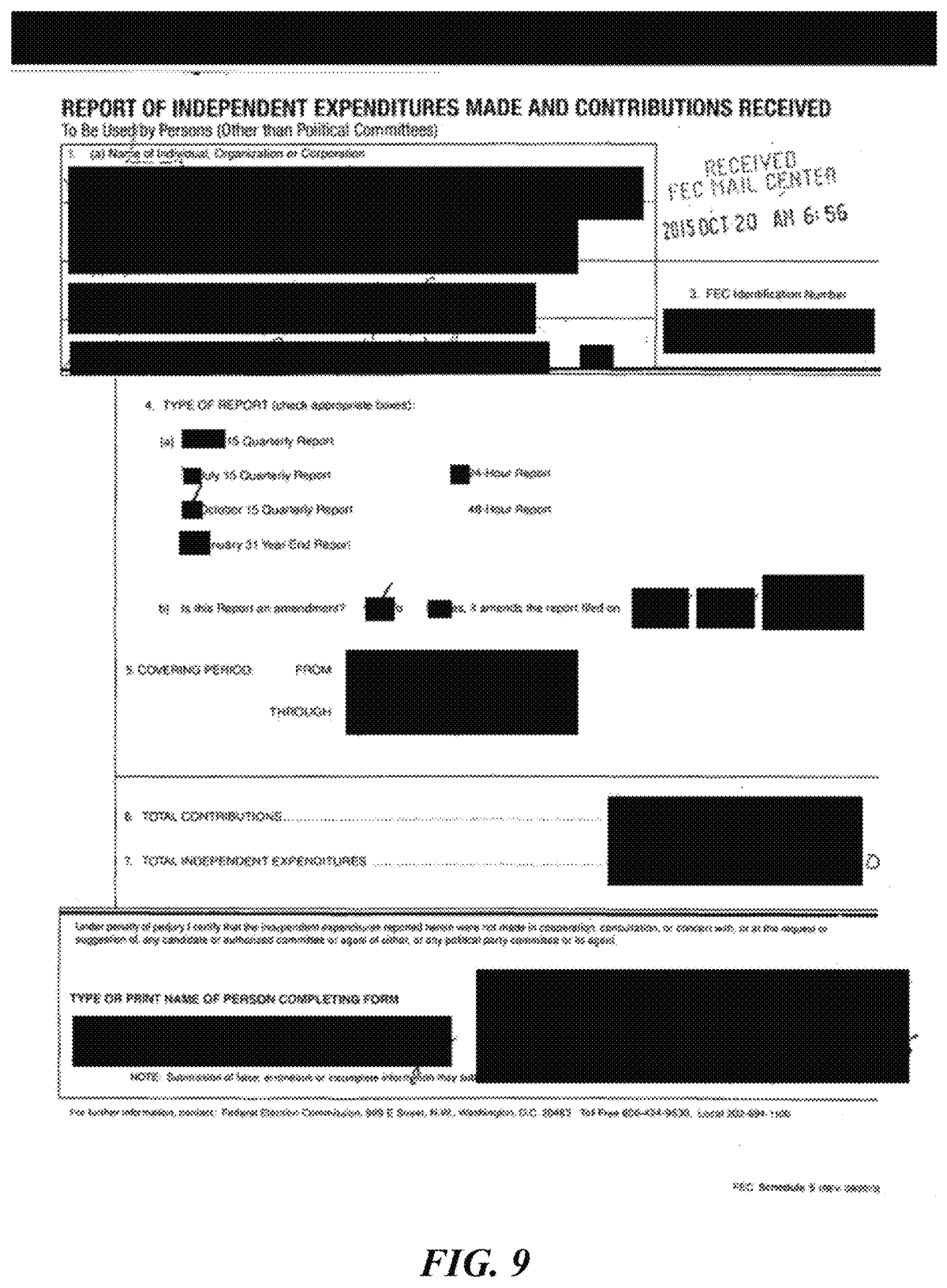

FIG. 9 is the detected field locations applied to the form of FIG. 2. Given the blocks 40 of the final product 38, the scanned image 20 is "shredded" (e.g., image data of the corresponding portions is extracted and sorted) at the coordinates of the blocks 40. Other methods and systems are then utilized in order to interpret the content of the shreds.

Embodiment of a Computer System

Figure 10:
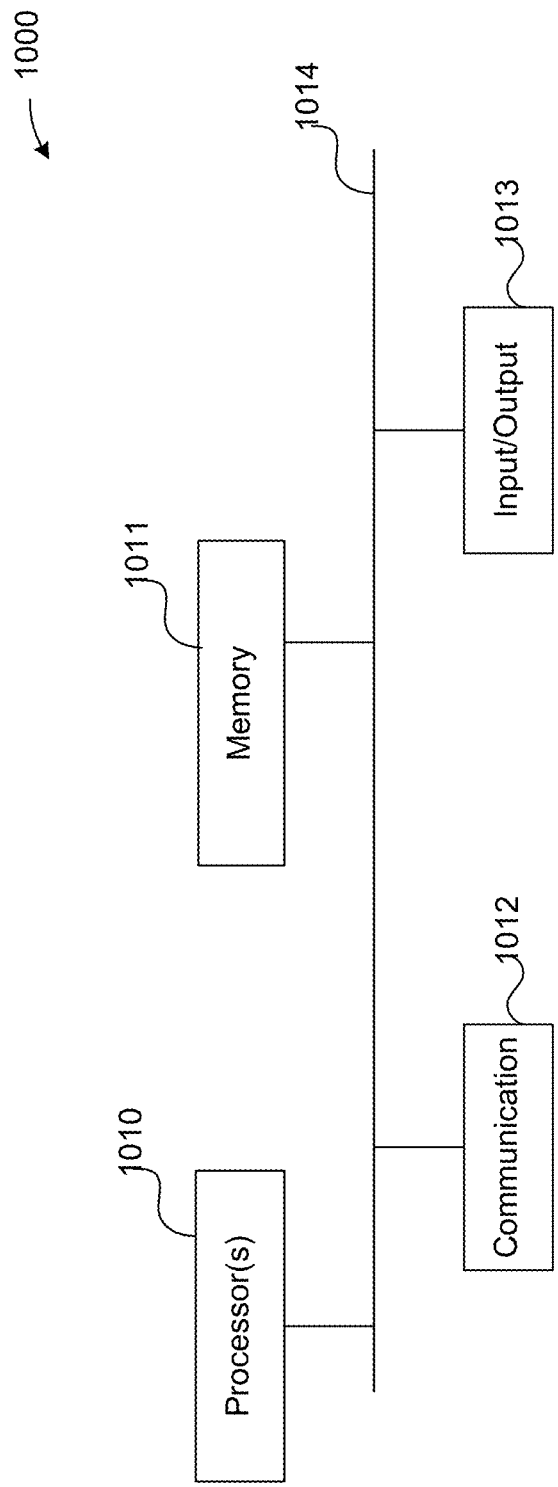
FIG. 10 is a block diagram illustrating an example of a processing system in which at least some operations described herein can be implemented, consistent with various embodiments.

FIG. 10 is a high-level block diagram illustrating an example of a processing system in which at least some operations described herein can be implemented, consistent with various embodiments. The processing system can be processing device 1000, which represents a system that can run any of the methods/algorithms described above. For example, processing device 1000 can be the computer system supporting the machine learning system, among others. A system may include more processing devices such as represented in FIG. 10, which may be coupled to each other via a network or multiple networks. A network can be referred to as a communication network.

In the illustrated embodiment, the processing device 1000 includes one or more processors 1010, memory 1011, a communication device 1012, and one or more input/output (I/O) devices 1013, all coupled to each other through an interconnect 1014. The interconnect 1014 may be or include one or more conductive traces, buses, point-to-point connections, controllers, adapters and/or other conventional connection devices. Each of the processors 1010 may be or include, for example, one or more general-purpose programmable microprocessors or microprocessor cores, microcontrollers, application specific integrated circuits (ASICs), programmable gate arrays, or the like, or a combination of such devices. The processor(s) 1010 control the overall operation of the processing device 1000. Memory 1011 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1011 may store data and instructions that configure the processor(s) 1010 to execute operations in accordance with the techniques described above. The communication device 1012 may be or include, for example, an Ethernet adapter, cable modem, Wi-Fi adapter, cellular transceiver, Bluetooth transceiver, or the like, or a combination thereof. Depending on the specific nature and purpose of the processing device 1000, the I/O devices 1013 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 1000 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

The invention claimed is:

1. A method comprising:
receiving image data of a plurality of filled-in forms having a first form type;
generating reduced image data by subtracting a set of pixels from each of the plurality of filled-in forms, the set of pixels are an inverted average of pixels within the image data;
determining pixel values comprising a pixel value for each pixel location in the reduced image data, wherein each pixel value of the pixel values represents a magnitude of variance of a corresponding pixel location in the reduced image data;
generating, based on the plurality of pixel values, an image representation of the reduced image data; and
calculating, based on the pixel values in the image representation, a plurality of coordinate sets of input fields in the first form type.

2. The method of claim 1, further comprising:
shifting the image data into greyscale.

3. The method of claim 1, further comprising:
inverting pixel values of the image data.

4. The method of claim 1, further comprising:
averaging pixels of the image data of the plurality of filled-in forms by corresponding pixel location; and
reconstructing the plurality of filled-in forms from said averaging.

5. The method of claim 4, wherein said subtracting pixels is of said reconstructing of the given filled-in form from the given filled-in form.

6. The method of claim 1, further comprising:
blurring the reduced image data.

7. The method of claim 1, wherein calculating a plurality of coordinate sets of input fields comprises:
identifying connected components of pixel values in the image representation;
calculating, based on the connected components, the plurality of coordinate sets of input fields.

8. The method of claim 7, wherein said identifying connected components further comprises:
filtering out connected components based on any of:
percentage coverage of a page; or
percentage coverage of a given axis on the page.

9. The method of claim 1, further comprising:
extracting image shreds from a given form of the plurality of filled-in forms based on the plurality of coordinate sets of input fields.

10. A system comprising:
a processor; and
a memory having instructions that when executed are configured to cause the processor to perform:
receiving image data of a plurality of filled-in forms having a first form type;
generating reduced image data by subtracting a set of pixels from each of the plurality of filled-in forms, the set of pixels are an inverted average of pixels within the image data;
determining pixel values comprising a pixel value for each pixel location in the reduced image data, wherein each pixel value of the pixel values represents a magnitude of variance of a corresponding pixel location in the reduced image data;
generating, based on the plurality of pixel values, an image representation of the reduced image data; and
calculating, based on the pixel values in the image representation, a plurality of coordinate sets of input fields in the first form type.

11. The system of claim 10, where the memory further has instructions that when executed cause the processor to perform:
shifting the image data into greyscale.

12. The system of claim 10, where the memory further has instructions that when executed cause the processor to perform:
inverting pixel values of the image data.

13. The system of claim 10, where the memory further has instructions that when executed cause the processor to perform:
averaging pixels of the image data of the plurality of filled-in forms by corresponding pixel location; and
reconstructing the plurality of filled-in forms from said averaging.

14. The system of claim 13, wherein said subtracting pixels is of said reconstructing of the given filled-in form from the given filled-in form.

15. The system of claim 10, where the memory further has instructions that when executed cause the processor to perform:
blurring the reduced image data.

16. The system of claim 10, wherein calculating a plurality of coordinate sets of input fields comprises:
identifying connected components of pixel values in the image representation; and
calculating, based on connected components, the plurality of coordinate sets of input fields.

17. The system of claim 16, wherein said identifying connected components further comprises:
filtering out connected components based on any of:
percentage coverage of a page; or
percentage coverage of a given axis on the page.

18. The system of claim 10, where the memory further has instructions that when executed cause the processor to perform:
extracting image shreds from a given form of the plurality of filled-in forms based on the plurality of coordinate sets of input fields.

* * * * *